June 12, 1962
E. GRETEN
3,038,527
PRESS FOR CHIP-BOARD MANUFACTURE
Filed June 24, 1959
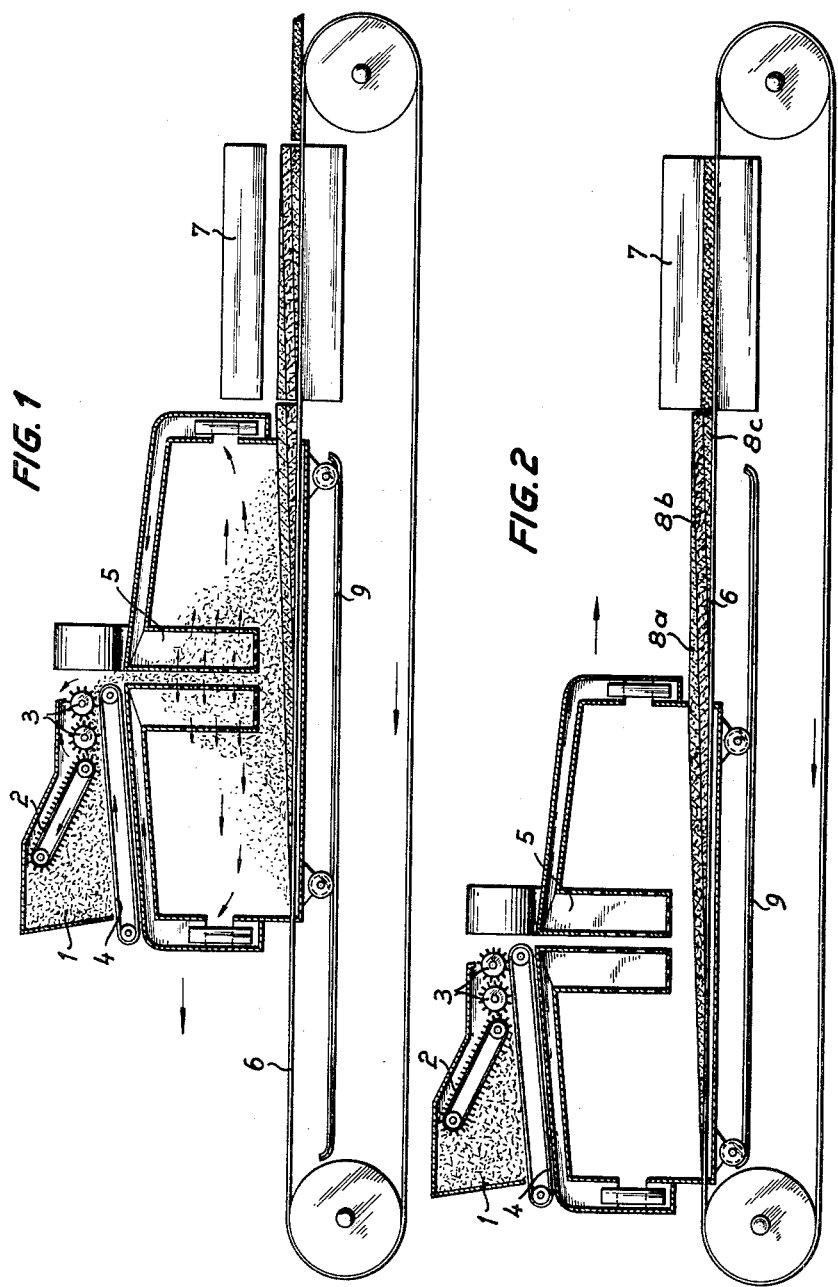
INVENTOR
Ernst Greten

United States Patent Office 3,038,527
Patented June 12, 1962

3,038,527
PRESS FOR CHIP-BOARD MANUFACTURE
Ernst Greten, Springe, near Hannover, Germany, assignor to Bahre Metallwerk Kommanditgesellschaft, Springe, near Hannover, Germany, a German company
Filed June 24, 1959, Ser. No. 822,500
3 Claims. (Cl. 156—580)

The invention relates to apparatus for forming a mat for chip-board manufacture.

Apparatus has previously been proposed in which chips of different thicknesses are distributed by a distributing device, in the form of an air separator, on to a mat carrier which moves forward uniformly during distribution relatively to the distributing device, after which the mat is moved into a press. Lengths of the mat are in this case cut off and introduced successively into a multilayer press. After the multilayer press has been completely filled, combined pressing of all the mat portions introduced into the press takes place. So that the multilayer press will not be of excessively high construction, the mat portions are pre-pressed so as to reduce their thickness. For economic reasons, to prevent parts of the apparatus from remaining idle for long periods, a high speed of mat formation must be maintained. Furthermore, conveying of the mat parts takes up much room and requires complicated auxiliary drives. The removal of the pressed boards from a multilayer press is likewise complicated.

According to the present invention, apparatus for forming a mat for chip-board manufacture comprises a device for distributing chips of varied thickness on to a fleece carrier, and a press for pressing a length of the fleece, means for moving said device to-and-fro along said fleece carrier through a distance substantially equal to the length of fleece which the press can accommodate, the apparatus being so operable that whilst the press is pressing a length of fleece, the fleece carrier is stationary and the distributing device is moved along the carrier distributing chips, and the distributing device is returned inoperative towards its starting position. The mat carrier is moved to bring a further length of fleece into the press.

The new device enables the binding medium of the chips to set in an economic manner. Setting of the glue by means of high-frequency currents is only possible with one-layer presses. Economic working with one-layer presses, however, can only be achieved if the idle periods are reduced to a minimum. This is accomplished by the invention, since the mat-forming time is practically no greater than the pressing time.

The invention provides the additional advantages that the foresaid pre-pressing may be omitted, and that a high-speed mat formation is no longer required.

The mat carrier is preferably in the form of an endless belt. This simplifies delivery of the pressed boards, and the space required for conveying the mat portions and pressed boards is considerably reduced.

One embodiment of the invention is illustrated in the accompanying diagrammatic drawings which show the press and distributing device in different working positions.

The distributing device 1, which is movable to-and-fro on rails 9 any suitable reversible propelling means (not shown), comprises a feed bunker for the glue-coated chips, with a proportioning belt 2, spiked rolls 3 and a discharge belt 4. The chip material discharged from the belt 4 passes in front of an air chest 5, from which air jets issue in a substantially horizontal direction on both sides and distribute the chip material, as indicated in FIGURE 1. The coarser chips drop down close to the air chest, while the finer chips are carried farther away by the air jets.

Near the bottom of the distributing device runs an endless belt 6, by means of which the formed mat is introduced into the one-layer press 7. With uniform proportioning and distributing of the material and uniform relative movement of the belt 6 with respect to the distributing device, there is produced on the belt a mat, the outer layers of which consist of finer chip material, while the core layer contains substantially only coarser chips. Layer 8a has just been formed in the last evolution of distributing device 1, while layer 8b was formed in the previous evolution and layer 8c was formed in the evolution just prior to that. It will be appreciated that at any one place along the mat the coarse chips will be in the middle and the fine chips on the top and bottom portions of the mat. In the drawing, for ease of illustration, three sharply differentiated layers are indicated. In fact, however, the three layers gradually merge into one another.

In operating the device, after a length of mat to be pressed has been moved into the press, the distributing device 1 is in its right-hand position (FIGURE 1), that is near the press 7. The press is now set in operation. At the same time, the distributing device commences operation and slowly moves to the left, the conveyor belt 6 being stationary. During this part of the operation, a mat is formed on the length of conveyor belt over which the distributing device moves. During the same period, a previously formed mat portion part is being pressed in the press. The speeds of pressing and forming are preferably adjusted with respect to each other so that the mat-forming time is equal to the pressing time.

The mat is severed near the press for example by sawing.

After completion of a pressing operation, the press 7 is opened and the conveyor belt 6 is moved on by any suitable periodically actuated driving means (not shown), so that the pressed mat portion is moved out of the press. Simultaneously, an unpressed mat portion is moved into the press. The distributing device 1 is returned from the position shown in FIGURE 2 to the position shown in FIGURE 1. The steps of the operation are repeated.

I claim:

1. A one layer press apparatus for chip-board manufacture comprising a movable continuous mat carrying belt extending beneath a movable distributing device and through a stationary press, said distributing device being movable along said belt to lay a mat thereon during each period said press is closed and said belt is stationary.

2. A one layer press apparatus for chip-board manufacture comprising a movable continuous mat carrying belt extending beneath a movable distributing device and through a stationary press, said distributing device being mounted for reciprocating movement along the belt away from and toward the press to lay a mat thereon during each period said press is closed and said belt is stationary.

3. A one layer press apparatus for chip-board manufacture comprising a movable continuous mat carrying belt extending beneath a movable distributing device and through a stationary press, said distributing device being mounted for reciprocating movement along the belt away from and toward the press to lay a mat thereon during said reciprocating movement away from the press while the press is closed and the belt is stationary.

References Cited in the file of this patent

UNITED STATES PATENTS

| | | |
|---|---|---|
| 2,567,721 | Mansfield et al. | Sept. 11, 1951 |
| 2,673,370 | Goss | Mar. 30, 1954 |
| 2,689,974 | Meyer | Sept. 28, 1954 |
| 2,746,895 | Duvall | May 22, 1956 |

FOREIGN PATENTS

| | | |
|---|---|---|
| 325,550 | Switzerland | Dec. 31, 1957 |
| 805,724 | Great Britain | Dec. 10, 1958 |
| 1,185,607 | France | Feb. 16, 1959 |